US009137364B2

(12) United States Patent
Gullapalli et al.

(10) Patent No.: US 9,137,364 B2
(45) Date of Patent: Sep. 15, 2015

(54) METHODOLOGIES FOR IMPLEMENTING SMART CONTROL OF VEHICLE CHARGING

(75) Inventors: Subhash B. Gullapalli, Ann Arbor, MI (US); Dana B. Fecher, Farmington Hills, MI (US); Nikola J. Pudar, Farmington Hills, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 776 days.

(21) Appl. No.: 13/107,474

(22) Filed: May 13, 2011

(65) Prior Publication Data

US 2012/0286725 A1 Nov. 15, 2012

(51) Int. Cl.
*H02J 7/00* (2006.01)
*H04M 3/51* (2006.01)
*H04M 15/00* (2006.01)
*H01M 10/44* (2006.01)
*B60L 11/18* (2006.01)

(52) U.S. Cl.
CPC ............. *H04M 3/51* (2013.01); *B60L 11/1846* (2013.01); *B60L 11/1848* (2013.01); *H01M 10/44* (2013.01); *H04M 15/68* (2013.01); *B60L 2230/40* (2013.01); *B60L 2240/70* (2013.01); *G05B 2219/25168* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
USPC ......... 320/104, 109, 107, 116, 339; 180/65.1, 180/65.01; 307/149; 701/22
See application file for complete search history.

(56) References Cited

U.S. PATENT DOCUMENTS

| 5,548,200 | A  * | 8/1996 | Nor et al. ...................... 320/109 |
| 6,680,547 | B1 * | 1/2004 | Dailey ............................. 307/31 |
| 6,766,874 | B2 * | 7/2004 | Naito et al. ................. 180/65.26 |
| 7,256,516 | B2 * | 8/2007 | Buchanan et al. ............... 307/62 |
| 7,906,937 | B2 * | 3/2011 | Bhade et al. ................... 320/109 |
| 2004/0130292 | A1* | 7/2004 | Buchanan et al. ............. 320/116 |
| 2007/0221422 | A1* | 9/2007 | Rosenstock .................. 180/65.3 |

FOREIGN PATENT DOCUMENTS

CN 101901944 A 12/2010

* cited by examiner

*Primary Examiner* — Yalkew Fantu
(74) *Attorney, Agent, or Firm* — Leydig, Voit & Mayer, Ltd.

(57) ABSTRACT

The described method and system provide for remotely controlling the charging operation of plurality of vehicles. In one implementation, a call center may receive a request from a utility regarding a particular grid and sends out an inquiry to locate vehicles in that grid. Once the vehicles have been located, the call center sends a command to those vehicles corresponding to the utility's request. In another implementation, vehicles may register information with the call center every time a charging event takes place, and the call center keeps track of the location of each vehicle based on the registration. When the call center receives a request from a utility, the call center may directly send out commands to vehicles based on the request. In other implementations, vehicle charging may be remotely controlled through the call center by consumers, the utility, or a home energy management system (HEMS). The charging control may further be customized based on a variety of information and preferences provided to the call center by the consumer, utility, or HEMS.

10 Claims, 5 Drawing Sheets

METHODOLOGIES FOR IMPLEMENTING SMART CONTROL OF VEHICLE CHARGING

BACKGROUND OF THE INVENTION

The technology utilized to store, manage, and consume power in electrically-powered vehicles has been improving steadily. Indeed, electrically-powered vehicles (hereinafter electric vehicles) are now competitive with fuel-powered vehicles on many performance parameters, and typically surpass fuel-powered vehicles in measures of efficiency, environmental cleanliness, and operating noise levels. This has led to an increase in the popularity of electric vehicles and hence to a steady increase in the number of such vehicles on the road and in use at any given time.

As electrically-powered vehicles continue to increase in number and popularity, the infrastructure used to charge such vehicles, such as electricity distribution systems, will become increasingly stressed. Local electrical substations are part of larger electricity generation, transmission and distribution systems (also referred to as electrical grids) where electrical power may be generated and transmitted to a local area serviced by the electrical substation. An electrical substation servicing an area may be stressed when multiple electric vehicles are charging simultaneously under certain conditions in the affected area. Thus, for example, when power draw on the grid increase to an unusual level, such as during periods of high temperature, the additional draw caused by charging numerous electric vehicle batteries may exacerbate an already existing infrastructure load problem.

Thus, it is an object underlying certain implementations of the described principles to provide a system and method for efficiently and remotely controlling the charging of vehicles based on the circumstances. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for remotely and selectively controlling the charging operation of a plurality of vehicles based on the circumstances. In one implementation, a call center may receive a request from a utility or a consumer (e.g. a user of a vehicle) to modify charging operation of the vehicle, whether to reduce, stop, delay, start, or increase charging. The utility could also request draining (i.e. discharging) of the vehicle battery (e.g. by requesting a rate and amount of reverse energy flow) to provide energy for home consumption or to be fed back into the grid. The request received from a utility may correspond to a power grid, as the utility may request a reduction or stoppage of charging for a plurality of vehicles charging on a grid operating at peak load. The call center may then command vehicles charging on the grid to reduce or stop charging.

In one implementation, the call center sends an inquiry to charging vehicles to determine which vehicles are charging on a particular grid. The vehicles may respond with their location information, and may further respond with additional charging-related information, including a charge level, rate of charge, fill up time, and/or expected ready-by time. In another implementation the vehicles register with the call center each time the vehicles start and stop charging or when the vehicle is plugged in but not charging immediately (e.g. in delayed mode or TOU (time-of-use) mode), or when the vehicle enters a pre-defined geographic boundary (e.g. 5 miles within the vehicle owner's home or office location) by sending registration information, which may include the location of the vehicles and/or additional charging-related information. The call center then stores the location and/or charging-related information of the vehicles at the call center and sends it to the utility, or the call center stores the information at a remote entity accessible to the utility. Based on the charging-related information and the location information, the utility may send requests to the call center to reduce the load on a power grid, and the call center or the utility may select particular vehicles to which charging modification commands are sent.

In further implementations, vehicle charging may be remotely controlled through the call center by consumers (e.g. drivers, owners, and users of the vehicle), the utility, or a home energy management system (HEMS). The charging control may further be customized based on a variety of information and preferences provided to the call center by the consumer, utility, or HEMS.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for remotely controlling the charging operation of a plurality of vehicles, providing a number of benefits to customers, utilities, and the telematics service provider (TSP). According to the principles described herein, customers will be able to control their vehicle charging to reduce their electric bill and reduce green house gas emissions, providing convenience, cost-savings, and benefiting the environment. Utilities will be able to reduce the load on their power grids during peak times of load demand and have the ability to match load with power generation. The TSP will be able to provide services to utilities on a large scale, providing revenues and cost savings, and the TSP will be able to take part in the management of electric grids.

In one general implementation, a call center first receives a request from a utility, e.g. an electric power entity, regarding a particular area or grid and then sends out an inquiry to locate vehicles in that area or grid (a grid may be associated with a single transformer). Once the vehicles have been located, the call center sends a command to those vehicles corresponding to the utility's request. In another general implementation, vehicles may register information with the call center every time a charging event takes place (e.g. the vehicle is plugged in or unplugged), and the call center keeps track of the location of each vehicle based on the registration. In this general implementation, when the call center receives a request from a utility, the call center may directly send out commands to vehicles based on the request. In other implementations, vehicle charging may be remotely controlled through the call center by consumers, the utility, or a HEMS. The charging control may further be customized based on a variety of information and preferences provided to the call center by the consumer, utility, or HEMS.

Figure 1:
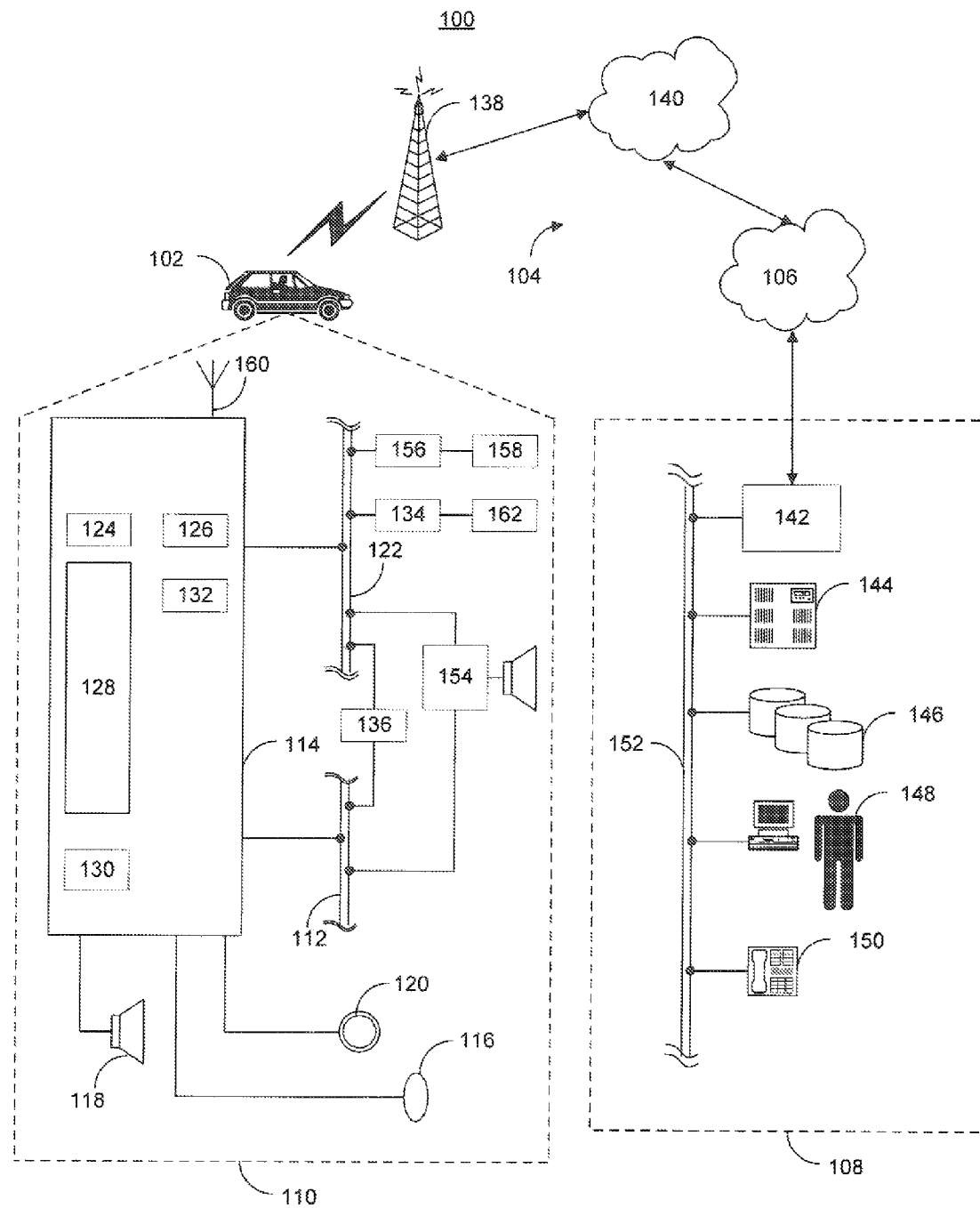
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile-vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection of vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114. The processing device 128 of telematics unit 114 may execute instructions stored on the electronic memory device 130, which may include a tangible, non-transient computer-readable medium, e.g. RAM, ROM, PROM, volatile, nonvolatile, or other electronic memory mechanism, adapted for storing computer-executable instructions and corresponding applications.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
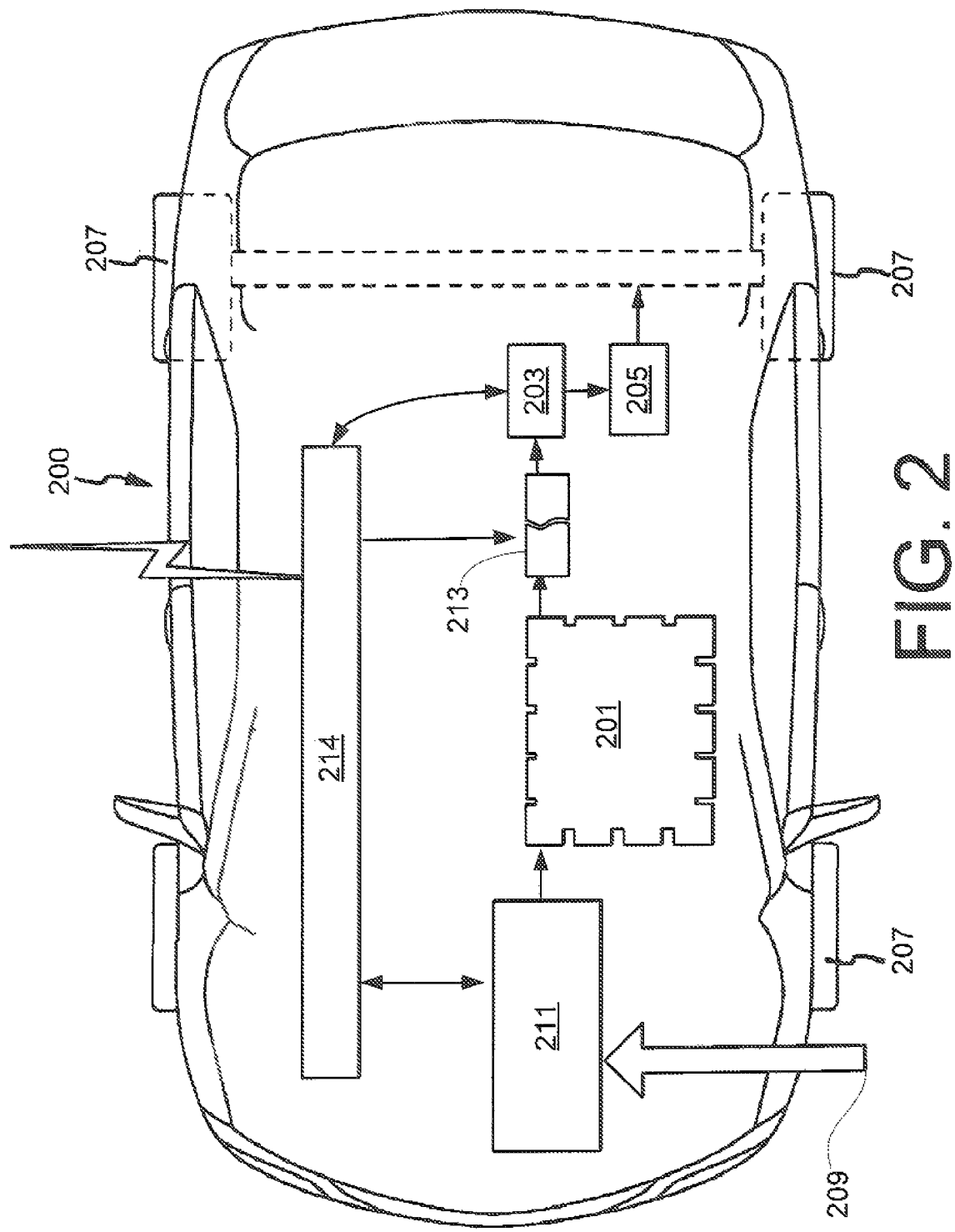
FIG. 2 is a schematic vehicle diagram showing relevant power links and communications linkages within the vehicle and between the vehicle and a remote entity.

As noted above, the telematics unit 114 and associated components are associated in an implementation of the invention with a vehicle 102. In particular, the vehicle 102 is a hybrid-electric or electric vehicle. FIG. 2 is a vehicle schematic showing the components of the vehicle of interest with the respect to the disclosed principles and the manner in which the components may be interrelated to execute those principles. It will be appreciated, however, that the illustrated architecture is merely an example, and that the disclosed principles do not require that the vehicle be configured precisely as shown.

In the illustrated example, the vehicle 200 (102) includes an electrical energy storage system 201 which is a battery or battery bank ("battery") of suitable voltage and capacity. Suitable battery types include but are not limited to lead acid batteries, Nickel Cadmium batteries (NiCd), Nickel Metal Hydride batteries (NiMH), Lithium Ion batteries and Lithium Polymer batteries.

The battery 201 is conductively linkable, e.g., via a motor controller 203, to an electrical drive unit 205, e.g., electrical motor or motors. The electrical energy may be modulated, voltage-modified, or otherwise modified by the motor controller 203 as needed to drive the electrical drive unit 205. The electrical drive unit 205 is linked or linkable to a ground engaging drive, typically including one or more wheels 207.

In one optional implementation, a plug interface 209 is provided in order to charge the battery 201, although it will be appreciated that the teachings herein apply beyond vehicles having plug-in architectures as well. The plug interface 209 is linked to the battery 201 via a charge controller 211. The telematics unit 214 (114) is adapted to receive information from the controller 211 as discussed above and to convey data regarding the battery as will be discussed more fully hereinafter. An optional aspect of the vehicle 200 and battery 201 is the ability to electrically disconnect the battery 201 from the rest of the vehicle by controlling at least one and preferably two or more high voltage contactors 213 if an adverse condition is detected.

In an implementation, the responsibility for battery charge state sensing and analysis is vested in the charge controller 211. Alternatively, the charge controller 211 may be responsible for sensing battery charge state, while the telematics unit 214 is responsible for analysis of charge state.

Figure 3:
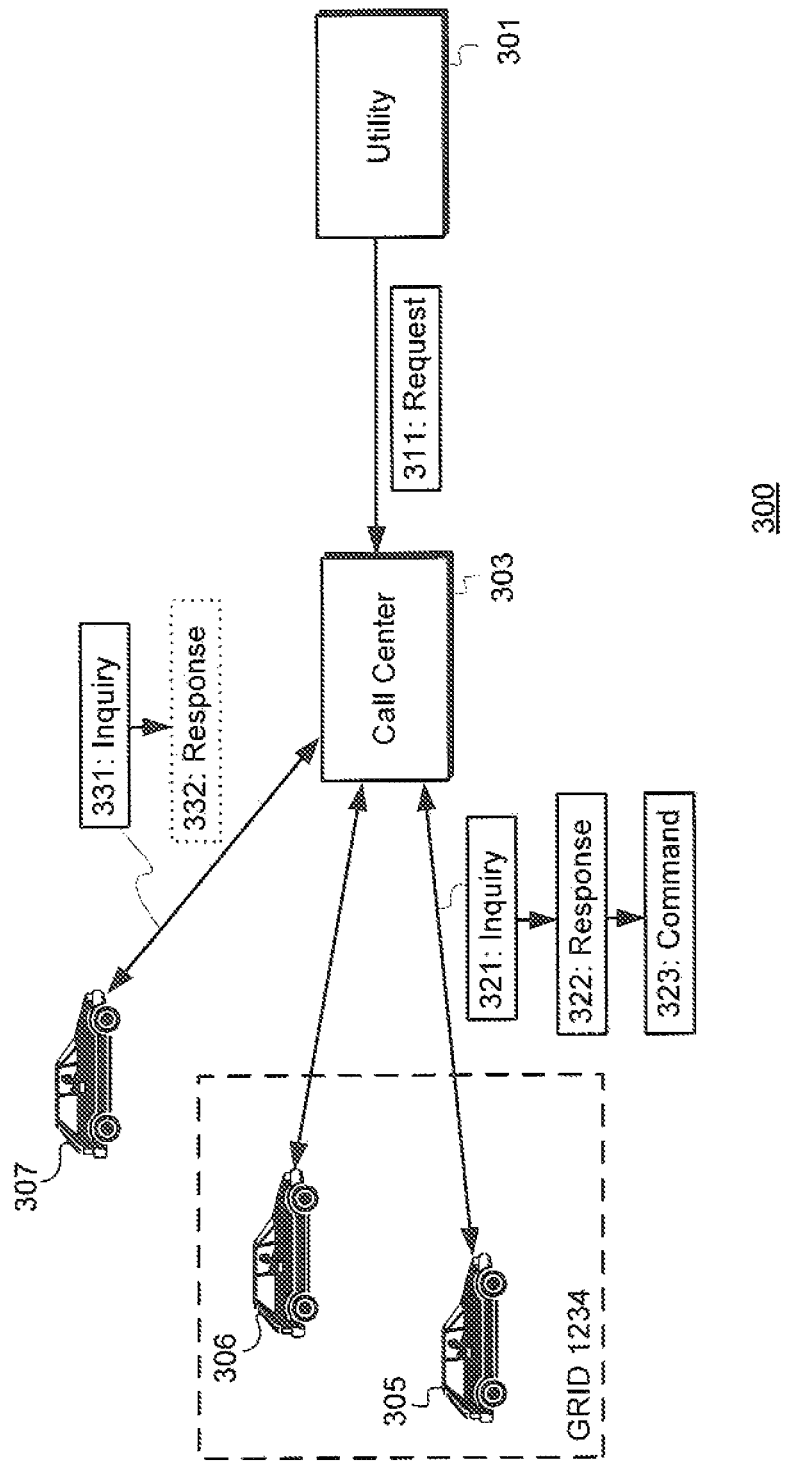
FIG. 3 is a diagram illustrating a process for remotely managing the charging of vehicles in a grid in accordance with an implementation of the described principles.

With further reference to the architecture of FIGS. 1 and 2, and turning more specifically to FIG. 3, an exemplary process 300 for remotely controlling the charging operation for vehicles on a grid is depicted. One set of circumstances under which it is desirable to modify the charging operation of vehicles is when a power grid is operating under peak load. In this illustrative example, vehicles 305 and 306 are located within a power grid, Grid 1234, and when Grid 1234 reaches peak load, the utility 301 sends a request 311 to the call center 303 requesting that vehicles on Grid 1234 have their charging delayed, reduced, or stopped in order to reduce the load on Grid 1234. It will be appreciated that, in certain circumstances, the utility 301 may further request that the vehicles on Grid 1234 discharge their batteries to feed energy back into the grid or provide energy to the home to which the vehicles are plugged into (for example, in emergency situations where Grid 1234 is severely overloaded and the electricity in the vehicle batteries may be needed elsewhere).

In a further implementation, the request may be more specific by, for example, including a particular number of minutes to delay, reduce, or stop charging for, or, in another example, the request could ask the call center to reduce power consumption by a total number of watts. In yet another further implementation, the number of requests that the utility is permitted to send may be limited by a time period (e.g. must wait between 15 minutes between requests, or a max of two requests per day), or the number of requests could be limited from a vehicle perspective (e.g. vehicles may stop responding to call center commands to stop charging after a certain number of charging requests per day).

In this exemplary process, the call center 303 does not know the current location of vehicles 305, 306 and 307, so the call center 303 sends out an inquiry 321, 331 to the vehicles to determine which vehicles are connected to Grid 1234. Vehicles charging within Grid 1234, vehicles 305 and 306, respond to the inquiry with their location information 322, notifying the call center 303 that those vehicles are placing load upon Grid 1234. The call center 303 then sends commands 323 to vehicles charging on Grid 1234 to delay, reduce or stop charging in accordance with the utility's request 311. It will be appreciated that the call center 303 communicates with the vehicles 305, 306, 307 over a network through the vehicles' telematics units.

In a further implementation, the vehicles 305, 306 may respond to the inquiry 321 with additional charging-related information 322, including but not limited to charge level, rate of charge, fill-up time, and expected "ready-by time." The call center 303 may then use this information to selectively pick vehicles to which commands should be sent. For example, the call center 303 may command vehicles that have high charge levels to stop charging, while commanding vehicles with low charge levels to reduce their charging rates. It will be appreciated that rather than the call center 303, a different entity such as the utility 301 could perform the customization of charging commands (e.g. the call center 303 can forward the charging-related information to the utility 301 and the utility 301 can decide which vehicles for which to stop, delay, of reduce charging).

When a vehicle which is not connected to Grid 1234, vehicle 307, receives the inquiry 331, it may respond 332 with its location, it may not respond at all, or it may respond with a "DUMB" signal that does not include any information. A response containing a vehicle location outside of Grid 1234 or a "DUMB" signal will notify the call center 303 that vehicle 307 is not in Grid 1234. Not sending a response at all would also have the same effect as the call center may simply not send a charging command to vehicles from which it did not receive a response.

If, after some amount of time of reduced charging, the load on Grid 1234 has dropped enough such that the utility determines that vehicles may resume normal charging operation, the utility may notify the call center 303 that Grid 1234 is now off its peak load and that the vehicles may resume charging. The call center 303 may then command vehicles connected to Grid 1234 that were previously commanded to reduce, stop, or delay charging, to increase or resume charging.

Figure 4:
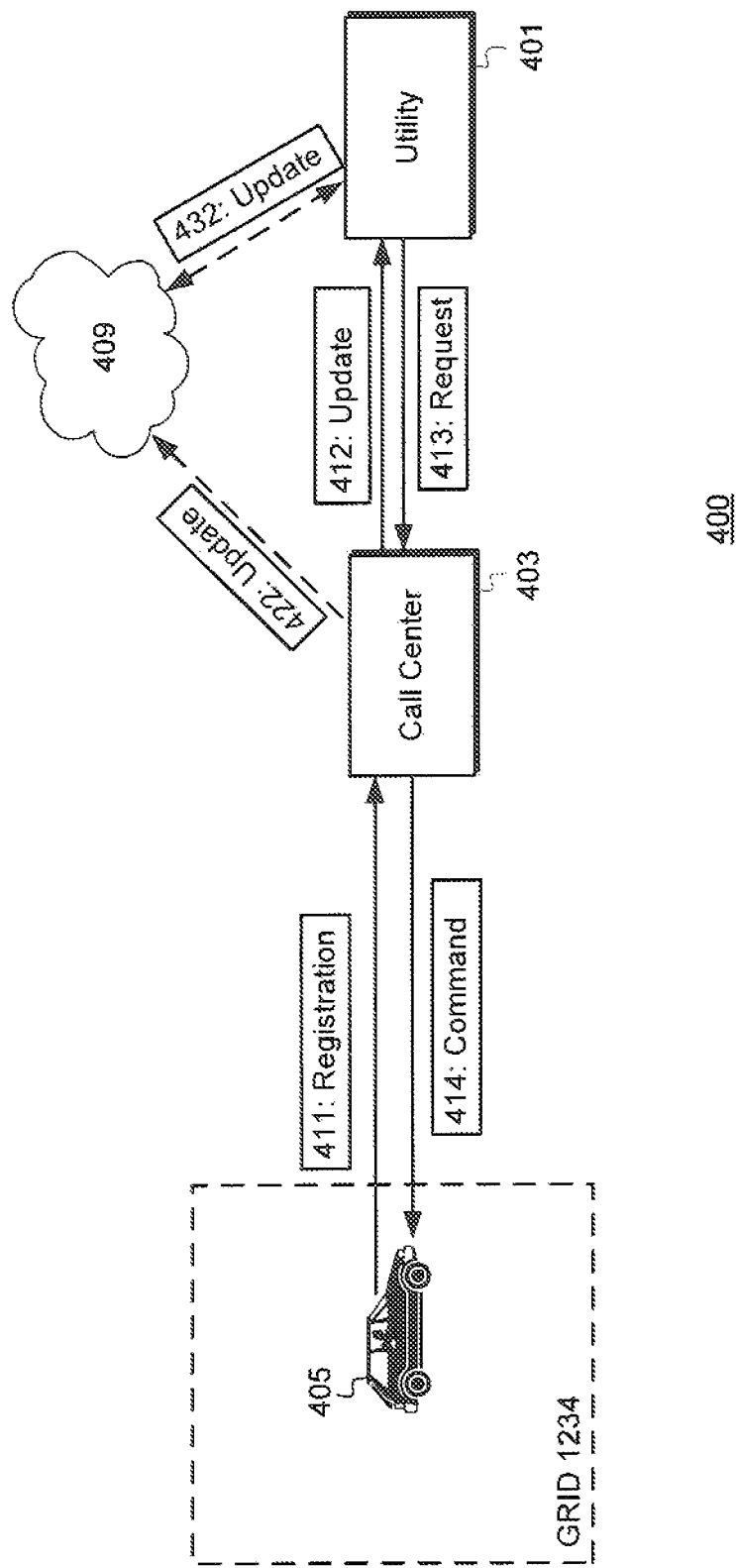
FIG. 4 is a diagram illustrating a process for remotely managing the charging of vehicles in a grid in accordance with another implementation of the described principles.

With further reference to the architecture of FIGS. 1 and 2, and turning more specifically to FIG. 4, an exemplary process 400 for remotely controlling the charging operation for vehicles on a grid is depicted, where the vehicle telematics units are programmed to register with the call center whenever the vehicles upon the occurrence of a charging-related event. Charging-related events may include, for example, the vehicles beginning to charge, stopping charging operation, when the vehicle is plugged in but not charging immediately (e.g. in delayed mode or TOU mode), or when the vehicle enters a pre-defined geographic boundary (e.g. 5 miles within the vehicle owner's home or office location). When a charging-related event occurs, the vehicle 405 registers 411 with call center 403 by sending location information, and may further send charge-related information including but not limited to charge level, rate of charge, fill-up time, and expected "Ready-by time." The call center 403 then updates its records regarding locations of vehicles, which may include which grid each registered vehicle is charging on (e.g. a "location-grid" mapping). The call center 403 may maintain the records at the call center, or may maintain them at a remote entity 409 (e.g. a computing cloud) by updating the remote entity with the information received from the registering vehicles 422. Similarly, the call center 403 may instead directly update the utility 401 regarding the locations and/or charge-related information of the registering vehicles by sending the information to the utility 412, or the utility may update its records 432 regarding locations and/or charge-related information of the registering vehicles by accessing the remote entity 409. In one implementation, both the call center 403 and the utility 401 may maintain records of vehicles and their charging locations. In another implementation, the call center 403 and the utility 401 may access remote storage of such records at a remote entity 409.

Then, when the utility 401 determines that the load on Grid 1234 is too high (e.g. the load passes a particular threshold amount), the utility 401 can send a request to the call center 403 to reduce the load on the grid. Similar to the process 300 with respect to FIG. 3, the request may be more specific by, for example, including a particular number of minutes to delay, reduce, or stop charging for, or, in another example, the request could ask the call center to reduce power consumption by a total number of watts. The request may further include selections by the utilities of particular vehicles for which the charging should be stopped, reduced, or delayed, based on charging-related information received from the vehicles. In another implementation, the utility 401 may send a generalized request to the call center 403, and the call center 403 may determine the vehicles for which charging should selectively be stopped, reduced or delayed based on the charging-related information received from the vehicles. In yet another implementation, the call center 403 may not require charging-related information from the vehicles and send commands that apply uniformly to all vehicles charging on Grid 1234.

In a further implementation, the call center 403 may not require location information from the vehicle 405 at all, if charging service for vehicle 405 is only offered at the vehicle's home location, of if the telematics unit of the vehicle 405 keeps track of the location and grid that the vehicle 405 is charging on. The call center 403 could broadcast a command 414 that vehicles on Grid 1234 must delay, reduce, or stop charging and the vehicle telematics units themselves can determine whether the vehicle is on Grid 1234 and needs to respond to the call center command.

Similar to the process 300 depicted in FIG. 3, if, after some amount of time of reduced charging, the load on Grid 1234 has dropped enough such that the utility determines that vehicles may resume normal charging operation, the utility may notify the call center 403 that Grid 1234 is now off its peak load and that the vehicles may resume charging. The call center 403 may then command vehicles connected to Grid 1234 that were previously commanded to reduce, stop, or delay charging, to increase or resume charging.

Figure 5:
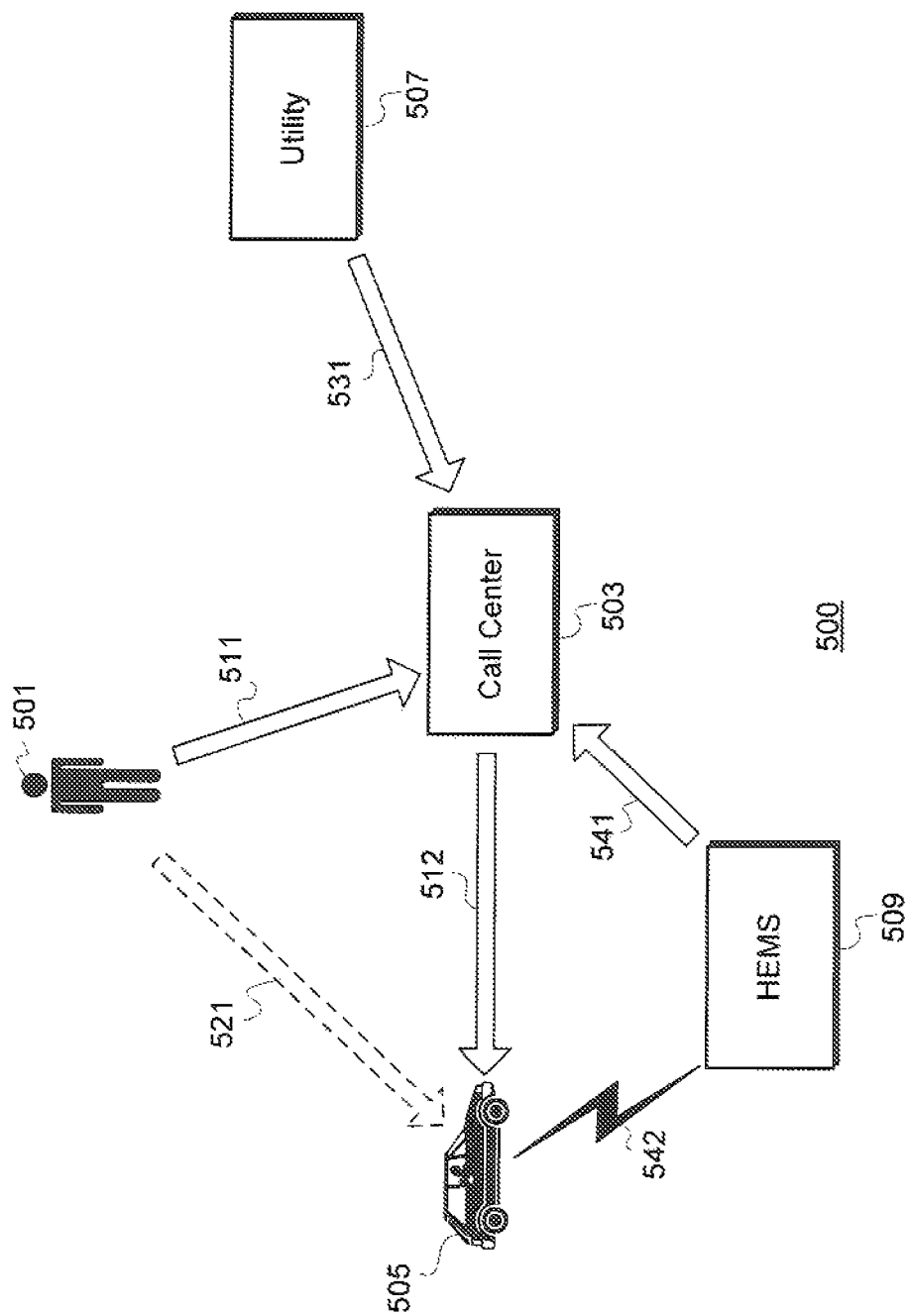
FIG. 5 is a diagram illustrating a process for remotely managing the charging of a vehicle by a consumer in accordance with an implementation of the described principles.

With further reference to the architecture of FIGS. 1 and 2, and turning more specifically to FIG. 5, a diagram 500 is depicted illustrating several other implementations of how a consumer 501, a home energy management system (HEMS) 509, or a utility 507 may remotely control the charging of the consumer's vehicle 505.

In one implementation, using a computer, mobile phone, or any other computing device capable of communicating over a network, the consumer 501 may send a request 511 to a call center 503 to begin, increase, reduce, delay, or stop charging the vehicle 505, and the call center 503 may send a corresponding command 512 to the vehicle 505. Through this method, the consumer 501 can control and customize the charging operation of the consumer's vehicle 501. For example, the consumer 501 may provide the ideal timing for charging of the consumer's vehicle 505 (e.g. the consumer prefers having the vehicle charged from 12 AM-6 AM) to the call center 503, and the consumer 501 may designate this timing as applying for a specific period (e.g. the next day, the next week, the next month, etc.). The call center then sends specific charge command messages 512 to the vehicle 505 for executing the charge schedule in accordance with the ideal timing provided by the consumer 501. In further implementations, the information sent from the consumer 501 to the call center 503 could also include a set charge level, set distance to be travelled, set green index (designating the source of the energy generated at the provider—gas, nuclear, coal, etc.—or designating a certain CO2 footprint) or other charge-related information.

In another implementation, the telematics unit of the vehicle 505 may be programmed such that the consumer 501 can send commands directly to the vehicle 505 without having to send a request 511 to the call center 503.

In yet another implementation, the utility 507 may provide 531 an ideal timing for charging vehicles (including vehicle 505) for a given region or grid (e.g. the utility may prefer charging vehicles on Grid 1234 from 12 AM-6 AM), and may further designate this ideal timing as applying for a specific period (e.g. the next day, the next week, the next month, etc.). The call center 503 then sends specific charge command messages 512 to the vehicle for executing the charge schedule in accordance with the ideal timing provided by the utility 507.

In yet another further implementation, the consumer 501, the utility 507, a HEMS, 509, or a vehicle 505 may provide TOU information pertaining to the vehicle, the home, and/or the grid or region to the call center 503. Based on the TOU information, the call center 503 may determine a time for charging vehicle 505. For example, the utility 507 may provide TOU rates associated with Grid 1234 to the call center 503 indicating that Grid 1234 has the least amount of load during the hours of 12 AM-6 AM, and based on this TOU information, the call center 503 may send charging commands to vehicles on Grid 1234 to delay their charging operation until those hours. It will be appreciated that the TOU information may be provided to the call center 503 in real-time, periodically at regular or irregular intervals, or according to other temporal schedules.

The call center 503 may further match utility TOU rates (provided real time or at a regular interval) with customer preferences (provided by the customer via mobile, web or other channel, real time or for that day or weeks/months in advance) or other provided information (such as information received from the HEMS) to control vehicle charging based on a combination of factors. For example, preferences and requests received from the consumer 501, the utility 507, and the HEMS 509 may be given different priority levels or different weights by the call center 503 to determine how the vehicle should be charged, or the call center 503 can take into account multiple sets of preferences (e.g. delaying the charging time to 12 AM due to the utility's request and charging only to 70% capacity based on the consumer's request).

In yet another further implementation the HEMS 509 may send charging control signals 541 to the call center 503 to manage vehicle charging to meet pre-set (by customer or utility) energy usage thresholds for the overall house or for optimizing overall energy costs. In certain implementations, a home may include an energy generation unit (e.g. wind turbine, solar panel, gas generator installed at home) used to charge 542 the vehicle 505. Information regarding the energy generated at home could be provided 541 to call center 503 via a network by the HEMS (or by other web applications or by the vehicle), and the call center 503 can use the information to control vehicle charging 512 based on information such as a pre-set threshold, time of day, or overall energy usage at home.

It will be appreciated that the described system allows for remotely and selectively controlling the charging operation of a plurality of vehicles based on the circumstances. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes ail modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for remotely controlling charging of vehicle batteries via a telematics service provider, the method comprising:
receiving, at a call center of the telematics services provider, a request from a utility to reduce load on a power grid associated with the utility;

identifying, by the call center, vehicles being charged by the power grid, wherein identifying the vehicles being charged by the power grid comprises receiving a message from a vehicle indicating which power grid the vehicle is connected to, wherein the message further comprises charging-related information, which includes at least one of the group consisting of: a charge level, rate of charge, fill up time, and expected ready-by time associated with the at least one vehicle; and sending, by the call center, a command to one or more of the identified vehicles to modify charging behavior so as to reduce the load on the power grid, wherein the command is sent to a telematics unit of each of the one or more identified vehicles.

2. The method of claim 1, the method further comprising:
sending, by the call center, an inquiry message to the vehicle to determine whether the vehicle is connected to a power grid and which power grid the vehicle is connected to.

3. The method of claim 1, wherein the command to modify charging behavior for a particular vehicle is based on charging-related information corresponding to the particular vehicle.

4. The method of claim 1, wherein the command to modify charging behavior is one of the group consisting of: a command to stop charging, and a command to reduce rate of charging.

5. A method for remotely controlling charging of vehicle batteries via a telematics service provider, the method comprising:
receiving, at a call center of the telematics services provider, a request from a utility to reduce load on a power grid associated with the utility;
identifying, by the call center, vehicles being charged by the power grid; and
sending, by the call center, a command to one or more of the identified vehicles to modify charging behavior so as to reduce the load on the power grid, wherein the command is sent to a telematics unit of each of the one or more identified vehicles;
wherein the method further comprises:
determining, by the call center, a battery charge status for a first vehicle being charged by the power grid and a second vehicle being charged by the power grid, wherein the battery charge status for the first vehicle exceeds a threshold and the battery charge status for the second vehicle does not exceed the threshold; and
wherein sending a command to one or more of the identified vehicles comprises: sending a first command to the first vehicle to stop charging and sending a second command to the second vehicle to reduce charging, wherein the first command is based on the battery charge status for the first vehicle and the second command is based on the battery charge status for the second vehicle.

6. A non-transitory computer-readable medium, part of a computing system of a call center of a telematics service provider, having processor-executable instructions stored thereon for remotely controlling charging of vehicle batteries via the telematics service provider, the processor-executable instructions, when executed by a processor, facilitate performance of the following steps:

receiving a request from a utility to reduce load on a power grid associated with the utility;
identifying vehicles being charged by the power grid, wherein identifying the vehicles being charged by the power grid comprises receiving a message from a vehicle indicating which power grid the vehicle is connected to, wherein the message further comprises charging-related information, which includes at least one of the group consisting of: a charge level, rate of charge, fill us time and expected read-by time associated with the at least one vehicle; and
sending a command to one or more of the identified vehicles to modify charging behavior so as to reduce the load on the power grid, wherein the command is sent to a telematics unit of each of the one or more identified vehicles.

7. The non-transitory computer-readable medium of claim 6, wherein the processor-executable instructions further facilitate performance of the following steps:
sending an inquiry message to the vehicle to determine whether the vehicle is connected to a power grid and which power grid the vehicle is connected to.

8. The non-transitory computer-readable medium of claim 6, wherein the command to modify charging behavior for a particular vehicle is based on charging-related information corresponding to the particular vehicle.

9. The non-transitory computer-readable medium of claim 6, wherein the command to modify charging behavior is one of the group consisting of: a command to stop charging, and a command to reduce rate of charging.

10. A non-transitory computer-readable medium, part of a computing system of a call center of a telematics service provider, having processor-executable instructions stored thereon for remotely controlling charging of vehicle batteries via the telematics service provider, the processor-executable instructions, when executed by a processor, facilitate performance, by the call center, of the following steps:
receiving a request from a utility to reduce load on a power grid associated with the utility;
identifying vehicles being charged by the power grid; and
sending a command to one or more of the identified vehicles to modify charging behavior so as to reduce the load on the power grid, wherein the command is sent to a telematics unit of each of the one or more identified vehicles;
wherein the processor-executable instructions further facilitate performance of the following steps:
determining a battery charge status for a first vehicle being charged by the power grid and a second vehicle being charged by the power grid, wherein the battery charge status for the first vehicle exceeds a threshold and the battery charge status for the second vehicle does not exceed the threshold; and
wherein sending a command to one or more of the identified vehicles comprises: sending a first command to the first vehicle to stop charging and sending a second command to the second vehicle to reduce charging, wherein the first command is based on the battery charge status for the first vehicle and the second command is based on the battery charge status for the second vehicle.

* * * * *